United States Patent [19]

Kisami

[11] 4,228,878
[45] Oct. 21, 1980

[54] CONTROL DEVICE FOR CONTROLLING ACCELERATOR AND BRAKE SWITCHES

[75] Inventor: Nobuyuki Kisami, Yokohama, Japan

[73] Assignee: Kabushiki Kaisha Komatsu Seisakusho, Tokyo, Japan

[21] Appl. No.: 882,563

[22] Filed: Mar. 2, 1978

[30] Foreign Application Priority Data

Mar. 4, 1977 [JP] Japan .......................... 52/25129[U]

[51] Int. Cl.² .................. B60T 17/00; F16D 67/00
[52] U.S. Cl. ................................................. 192/2
[58] Field of Search ............ 180/65 R; 192/3 TR, 192/3 M, 2

[56] References Cited

U.S. PATENT DOCUMENTS

| | | | |
|---|---|---|---|
| 1,339,929 | 5/1920 | Hellmund | 192/2 X |
| 1,591,944 | 7/1926 | Ring et al. | 192/3 TR |
| 2,215,357 | 9/1940 | Nicholson et al. | 192/2 |
| 2,361,099 | 10/1944 | Hines | 192/2 |

*Primary Examiner*—George H. Krizmanich

*Attorney, Agent, or Firm*—Spensley, Horn, Jubas & Lubitz

[57] ABSTRACT

A control device for controlling accelerator and brake switches is designed to prolong life of the accelerator and brake switches as well as life of electromagnetic contactors for the accelerator and brakes which are energized and deenergized by these switches. According to the invention, once the accelerator switch has been turned on by depression of an accelerator pedal, the ON state of the accelerator switch is maintained unless a brake pedal is subsequently depressed. Similarly, once the brake switch has been turned on by depression of the brake pedal, the ON state of the brake switch is maintained unless the accelerator pedal is subsequently depressed. To this end, the control device comprises changeover valves respectively actuated by the accelerator and brake pedals, bistable means for performing a mechanical bistable operation by means of air supplied through the changeover valves and accelerator and brake switches actuated in correspondence to two positions of the bistable means.

3 Claims, 3 Drawing Figures

CONTROL DEVICE FOR CONTROLLING ACCELERATOR AND BRAKE SWITCHES

DETAILED DESCRIPTION OF THE INVENTION

This invention relates to a control device for an accelerator switch used for moving an electrically driven vehicle and a brake switch used for electrically braking the vehicle.

Figure 1:
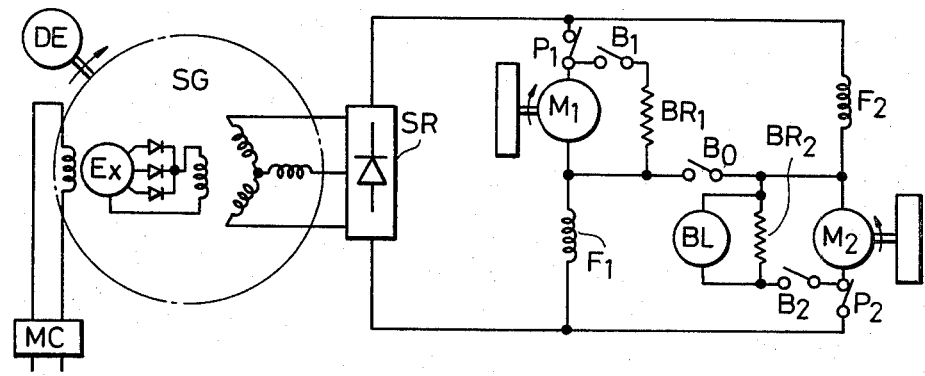
FIG. 1 is a diagram of the circuit of the present invention.

A circuit for electrically driving an electrically driven vehicle as shown in FIG. 1 includes an AC generator SG which is driven by a diesel engine DE. An alternating current generated by the AC generator SG is rectified into a direct current by a rectifier SR and thereafter is supplied to armatures $M_1$, $M_2$ and field coils $F_1$, $F_2$ of electric motors coupled to drive wheels of the vehicle to drive the wheels. The electric motors are controlled by energization and deenergization of electromagnetic contactors $P_1$, $P_2$ for an accelerator and electromagnetic contactors $B_0$, $B_1$ and $B_2$ for brakes. Reference characters $BR_1$ and $BR_2$ designate resistors for the brakes, BL a blower motor, MC a control box and EX an exciter, respectively. The electromagnetic contactors $P_1$ and $P_2$ are closed upon being energized by an accelerator switch (not shown in FIG. 1) whereas the electromagnetic contactors $B_0$, $B_1$ and $B_2$ are closed upon being energized by a brake switch (not shown). The contactors $P_1$ and $P_2$ are electrically and mechanically interlocked with the contactors $B_0$, $B_1$ and $B_2$ so that the contactors for the accelerator are not closed simultaneously with the contactors for the brakes.

The accelerator switch for controlling the electromagnetic contactors $P_1$ and $P_2$ and the brake switch for controlling the electromagnetic contactors $B_0$, $B_1$ and $B_2$ are turned on and off by actuation of an air cylinder which in turn is controlled by depression and release of accelerator and brake pedals.

Figure 2:
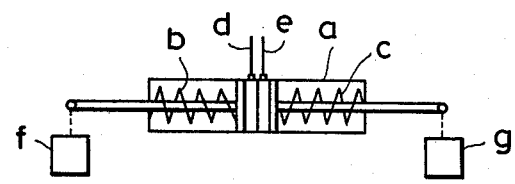
FIG. 2 is a diagram showing the operation of a prior art device.

A prior art device for controlling these accelerator and brake switches is shown in FIG. 2. In FIG. 2, an air cylinder a is a dual type air cylinder having two pistons and two rods with return springs b and c provided between the two ends of the cylinder a and the respective pistons. As the accelerator pedal is depressed, air if supplied through a circuit d to the cylinder a to actuate an accelerator switch f. As the brake pedal is depressed, air is supplied through a circuit e to the air cylinder a to actuate a brake switch g. Accordingly, the respective pistons in the air cylinder a reciprocate in accordance with depression and release of the corresponding pedals and the accelerator and brake switches are turned on and off in accordance with the depression and release of the corresponding pedals.

This prior art control device causes a problem that the electromagnetic contactors for the accelerator and brakes are frequently energized and deenergized in response to turning on and off of the accelerator and brake switches with resulting requirement for frequent maintenance of these contactors and switches and inevitable shortening of their life.

It is, therefore, an object of the present invention to provide a control device for accelerator and brake switches in an electrically driven vehicle eliminating the above described disadvantage of the prior art control device.

It is another object of the invention to provide a control device for accelerator and brake switches capable of avoiding too frequent energization and deenergization of the electromagnetic contactors. According to the invention, once the accelerator or brake switch is turned on upon depression of the corresponding accelerator or brake pedal, the switch remains in the ON state until the other pedal is depressed and this ON state is not affected by release and redepression of the same pedal during this time. Accordingly, the switch is not turned on and off however frequently the same pedal may be depressed and released unless the other pedal is depressed and, as a result, frequent energization and deenergization of the contactors can be avoided and life of the switches and contactors can be prolonged.

According to the invention, there is provided a control device for controlling accelerator and brake switches used for opening and closing electromagnetic contactors for an accelerator and brakes provided in a motor driving circuit of an electrically driven vehicle comprising mechanical bistable means having two entrance ports for bringing a desplaceable member to one position upon introduction of air from one of said entrance ports, said displaceable member remaining in said one position notwithstanding subsequent interruption or reintroduction of air to said one entrance port and being displaced from said one position to another position only upon introduction of air from the other entrance port; a first changeover valve for supplying air to said one entrance port upon depression of an accelerator pedal; a second changeover valve for supplying air to said other entrance port upon depression of a brake pedal; an accelerator switch disposed in a position in which it is turned on when said displaceable member of the bistable means is brought to said one position; and a brake switch disposed in a position in which it is turned on when said displaceable member is brought to the other position.

The invention will now be described with reference to FIG. 3 which is a schematic circuit diagram showing an embodiment of the present invention.

Figure 3:
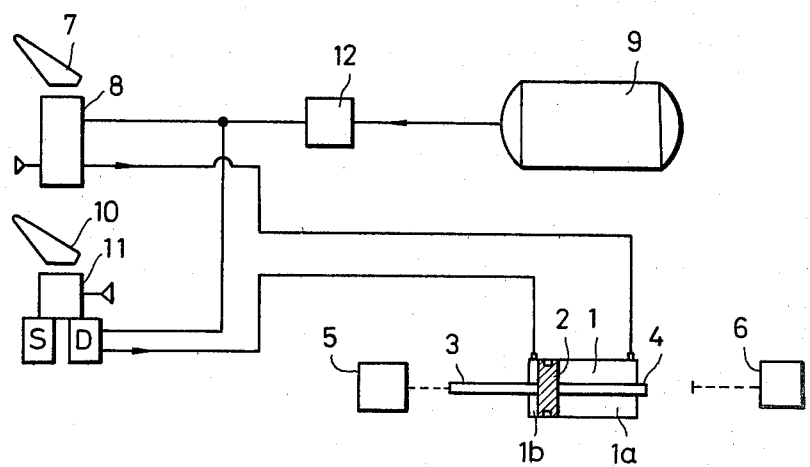
FIG. 3 is a schematic diagram showing the operation of the present invention.

In FIG. 3, an air cylinder 1 is provided as an example of the bistable means for changing an on-off state of accelerator and brake switches. The air cylinder 1 is of a one-piston/two-rod type in which two rods 3 and 4 are fixed to a piston 2 on both sides thereof. An accelerator switch 5 is provided on the side of the rod 3 and a brake switch 6 is provided on the side of the rod 4. These switches are constructed so that each of them is turned on by projecting of its corresponding rod 3 or 4 from the air cylinder 1 and turned off by retraction of the corresponding rod 3 or 4 into the air cylinder 1. A chamber 1a for actuating the accelerator switch 5 is communicated with an air tank 9 through a changeover valve 8 which is opened and closed by an accelerator pedal 7, whereas a chamber 1b for actuating the brake switch 6 is communicated with the air tank 9 through a changeover valve 11 which is opened and closed by a brake pedal 10. Reference numeral 12 designates a mist separator.

If the operator of the vehicle depresses the accelerator pedal 7, the piston 2 of the air cylinder 1 is displaced to the left as viewed in the figure to turn on the accelerator switch 5. If the operator releases the accelerator pedal 7, the piston 2 is not moved and the accelerator switch 5 therefore remains in the ON state. This ON state of the accelerator switch 5 is maintained however frequently the operator subsequently depresses or releases the accelerator pedal 7 until he depresses the brake pedal 10. Accordingly, the electromagnetic contactors for the accelerator coupled to the switch 5 are maintained in an ON state.

When the operator depresses the brake pedal 10, the piston 2 is displaced to the opposite side to turn off the accelerator switch 5 and turn on the brake switch 6. This deenergizes the contactors for the accelerator and energizes the contactors for the brakes to close an electrical circuit for applying an electric braking. For the same reason as described above, the piston 2 is not moved by subsequent release and depression of the brake pedal 10 so that the contactors for the brake are maintained in an ON state until the accelerator pedal 7 is depressed.

The accelerator and brake switches 5 and 6 preferably are composed of limit switches which are actuated by a very small force so that a frictional resistance of a seal provided on the piston 2 will sufficiently maintain the on-off state of these switches once it has been established.

The accelerator pedal 7 and the brake pedal 10 are normally operated by a right foot only. If the operator should depress both pedals simultaneously using both right and left feet, the piston 2 of the air cylinder 1 still moves to one side only, i.e., from the side on which air of a higher pressure is introduced to the opposite side, however small the difference in air pressure may be. Accordingly, the circuits for the accelerator and the brakes can never be closed simultaneously. The structure of the present invention therefore is meritorious in that the accelerator switch 5 and the brake switch 6 are interlocked with each other without provision of any other special arrangements whereby troubles which may be caused by an erroneous operation by the operator or mulfunction of control elements can be successfully avoided by the very simple construction.

What is claimed is:

1. A control device for controlling accelerator and brake switches used for opening and closing electromagnetic contactors for an accelerator and brakes provided in a motor driving circuit of an electrically driven vehicle comprising:

mechanical bistable means having two entrance ports for bringing a displaceable member to one position upon introduction of air from one of said entrance ports, said displaceable member remaining in said one position notwithstanding subsequent interruption or reintroduction of air to said one entrance port and being displaced from said one position to another position only upon introduction of air from the other entrance port;

a first changeover valve for supplying air to said one entrance port upon depression of an accelerator pedal;

a second changeover valve for supplying air to said other entrance port upon depression of a brake pedal;

an accelerator switch disposed in a position in which it is turned on when said displaceable member of the bistable means is brought to said one position; and a brake switch disposed in a position in which it is turned on when said displaceable member is brought to the other position.

2. A control device as defined in claim 1 wherein said bistable means is a one-piston/two rod type air cylinder.

3. A control device as defined in claim 1 wherein said accelerator and brake switches consist of limit switches.

* * * * *